US012283151B2

(12) United States Patent
Sahl

(10) Patent No.: US 12,283,151 B2
(45) Date of Patent: *Apr. 22, 2025

(54) ELECTRONIC GAMING MACHINE WITH POTENTIAL MATCHING SEGMENTS IN ADJACENT HORIZONTAL FRAMES

(71) Applicant: DK Crown Holdings Inc., Boston, MA (US)

(72) Inventor: Daniel Sahl, Las Vegas, NV (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/521,502

(22) Filed: Nov. 28, 2023

(65) Prior Publication Data

US 2024/0096166 A1 Mar. 21, 2024

Related U.S. Application Data

(63) Continuation of application No. 17/982,940, filed on Nov. 8, 2022, now Pat. No. 11,861,973, which is a continuation of application No. 16/939,164, filed on Aug. 15, 2020, now Pat. No. 11,501,598.

(60) Provisional application No. 62/886,415, filed on Aug. 14, 2019.

(51) Int. Cl.
*G07F 17/32* (2006.01)

(52) U.S. Cl.
CPC ...... *G07F 17/3213* (2013.01); *G07F 17/3209* (2013.01); *G07F 17/3239* (2013.01); *G07F 17/3258* (2013.01); *G07F 17/3262* (2013.01); *G07F 17/3267* (2013.01)

(58) Field of Classification Search
None
See application file for complete search history.

(56) References Cited

U.S. PATENT DOCUMENTS

| | | | | |
|---|---|---|---|---|
| 2003/0203752 | A1* | 10/2003 | Kaminkow | G07F 17/3244 463/20 |
| 2003/0203753 | A1 | 10/2003 | Muir et al. | |
| 2005/0261052 | A1* | 11/2005 | Dunaevsky | G07F 17/34 463/20 |
| 2008/0113739 | A1* | 5/2008 | Visser | G07F 17/34 463/20 |
| 2011/0086695 | A1* | 4/2011 | Evans | G07F 17/32 463/43 |
| 2014/0274308 | A1* | 9/2014 | Guinn | G07F 17/3244 463/25 |
| 2016/0180639 | A1* | 6/2016 | Ditton | G07F 17/3213 463/20 |
| 2020/0058197 | A1* | 2/2020 | Cong | G07F 17/3225 |
| 2020/0105091 | A1 | 4/2020 | Halvorson | |

OTHER PUBLICATIONS

Final Office Action on U.S. Appl. No. 16/939,164 dated Apr. 26, 2022.

(Continued)

*Primary Examiner* — Jason T Yen
(74) *Attorney, Agent, or Firm* — Foley & Lardner LLP

(57) ABSTRACT

A video gaming machine provides partial symbols that match other partial symbols across adjacent horizontal frames. Matches of two melding frames provides absolute payouts, multipliers, bonus events and the like.

20 Claims, 5 Drawing Sheets

(56) References Cited

OTHER PUBLICATIONS

Non-Final Office Action on U.S. Appl. No. 16/939,164 dated Nov. 1, 2021.
Non-Final Office Action on U.S. Appl. No. 17/982,940 dated Apr. 7, 2023.
Notice of Allowance on U.S. Appl. No. 16/939,164 dated Jul. 19, 2022.
Notice of Allowance on U.S. Appl. No. 17/982,940 dated Aug. 31, 2023.

* cited by examiner

ELECTRONIC GAMING MACHINE WITH POTENTIAL MATCHING SEGMENTS IN ADJACENT HORIZONTAL FRAMES

RELATED APPLICATIONS DATA SECTION

This application is a continuation of and claims priority to U.S. patent application Ser. No. 17/982,940, filed Nov. 8, 2022, which is a continuation of and claims priority to U.S. patent application Ser. No. 16/939,164, filed Aug. 15, 2020, which claims priority under U.S. Statutes and Regulations from Provisional Patent Application Ser. No. 62/886,415, filed 14 Aug. 2019 and titled ELECTRONIC GAMING MACHINE WITH POTENTIAL MATCHING SEGMENTS IN ADJACENT HORIZONTAL FRAMES. The contents of each of which are hereby incorporated by reference in their entireties for all purposes.

BACKGROUND OF THE INVENTION

1. Field of the Invention

The present invention relates to the field of wagering on electronic gaming machines with at least 3×3 columns and rows.

2. Background of the Art

Games of chance have been enjoyed by people for thousands of years and have enjoyed widespread popularity in recent times. Many people enjoy playing variations of games that they have not played before. Playing new variations of games adds to the excitement of this recreational activity, particularly when some form of gaming is involved. As used herein, the terms “gaming” and “gaming devices” are used to indicate that some form of wagering is involved and that players must make wagers of value, whether actual currency or some equivalent of value, e.g., token or credit.

Players involved in games of wagering often enjoy new games or variations of old games with relatively simple rules that can be readily learned by a beginner or casual player. Variations to a game with respect to the method of wagering and the ability to increase winnings attracts more players and is desired in the industry. The ability to increase winnings where risk is involved based on the selection of a possible random outcome is also highly desired, There has been an accelerating evolution of gaming devices over the past few decades. At the beginning of this evolution, there were mechanical gaming devices, such as the traditional slot machine. The advent of relatively inexpensive computer processors and associated display devices in the form of electronic gaming devices allowed the introduction of computer-emulated games and a pseudo (video) display of the movement of reels or other elements of a mechanical device as well as the game outcome. The next evolutionary step was the integration of communication capabilities between servers and other computers and electronic gaming devices, allowing the interchange of data and information between electronic gaming devices and an operator such as a casino via a network between computers.

The development of communications between gaming machines and networks allowed for the development of systems allowing the players at those machines to compete for additional prizes while playing the traditional wagering games. Among these are progressive gaming systems, such as those disclosed in U.S. Pat. Nos. 4,837,728 and 5,855,515, the disclosures of which are incorporated herein by reference. In a progressive system, a number of gaining machines are linked together and an additional or bonus prize is made available, which increases in value as wagers are placed on the machines and a portion of each wager is allocated into a bonus prize pool, Each coin drop freezes the available bonus amount for that game. When a player wins, the entire amount of the progressive bonus is awarded and the progressive game restarts. While players are attracted to larger progressive bonuses, after an award of the bonus, interest in playing the machines can wane due to the small amount of the available bonus prize.

A current enhancement to the market is the addition of secondary or bonus games to slot machines. These gaming machines allow a player to participate in an additional or “bonus” game and thereby have a chance to earn an additional payout or bonus prize. The bonus game is typically a single event, or a sequential event where progress through the bonus game is determined by the continuation of play on the slot machine. Examples of such bonus games are disclosed in U.S. Pat. Nos. 6,089,978, 6,089,976 and 5,796,716, the disclosures of which are incorporated herein by reference. These bonus games conventionally begin when a selected random event occurs in a primary game on a gaming machine. The bonus game is then activated and begins. At the end of the game, an indicated payout value is awarded as a bonus prize. The bonus games disclosed in these references include a prize wheel that spins, a number of computer generated options that are selected to receive bonuses until an end game signal is reached, or a dexterity- or skill-based video game.

U.S. Pat. No. 6,190,255, the disclosure of which is incorporated herein by reference, discloses modifications that may be made to a bonus game. A random occurrence in a base game, such as the occurrence of a special symbol combination, causes a computer processor to generate a resource exercisable in the bonus game. For example, a resource can be used to override the end bonus outcome and continue the bonus game to receive a different end outcome.

The networking of computers has also allowed and improved the ability to track the usage of individual gaming machines including the players using such a machine. Player tracking systems allow for the management of large numbers of gaming machines and players simultaneously. Examples of player tracking systems maybe found in U.S. Pat. Nos. 6,165,071, 6,048,269, and 5,655,961, the disclosures of which are incorporated herein by reference. Such systems allow players to carry credits from one gaming machine to another, thereby avoiding or at least minimizing the use of coins or tokens, to track the gaming usage of the players for marketing purposes and to allow the players to play for a higher payout upon meeting certain conditions.

SUMMARY OF THE INVENTION

In an electronic gaming system, a player placing value at risk as a game wager from a credit source in memory associated with a processor is funded through the value-in-value-out system;

- the processor distributing random symbols into each frame of an at m least 3-column by 3-row frame array displayed on a visual display;
- at least some distributed symbols comprising partial symbols extending towards an edge of a first frame, wherein the edge of the first frame is adjacent an edge of an adjacent second frame in the at least 3-rows in the array;

the processor identifying completed symbols formed by the first frame symbol and a second partial symbol in the adjacent second frame;

the processor scoring the identified completed symbols as at least one of an immediate award to be paid, a multiplier for another award resulting from winning symbol outcomes in all of the frames an at least 3-column by 3-row frame array displayed on the visual display, or a trigger for an additional round of play or jackpot event; and wherein the processor with memory resolves the value at risk against a paytable for a) the identified completed symbols as at least one of an immediate award to be paid, b) the multiplier for another award resulting from winning symbol outcomes in all of the frames in the at least 3-column by 3-row frame array displayed on the visual display, or c) an additional gaming event initiated by the processor with memory for the additional round of play or the jackpot event.

DETAILED DESCRIPTION OF THE INVENTION

Figure 1:
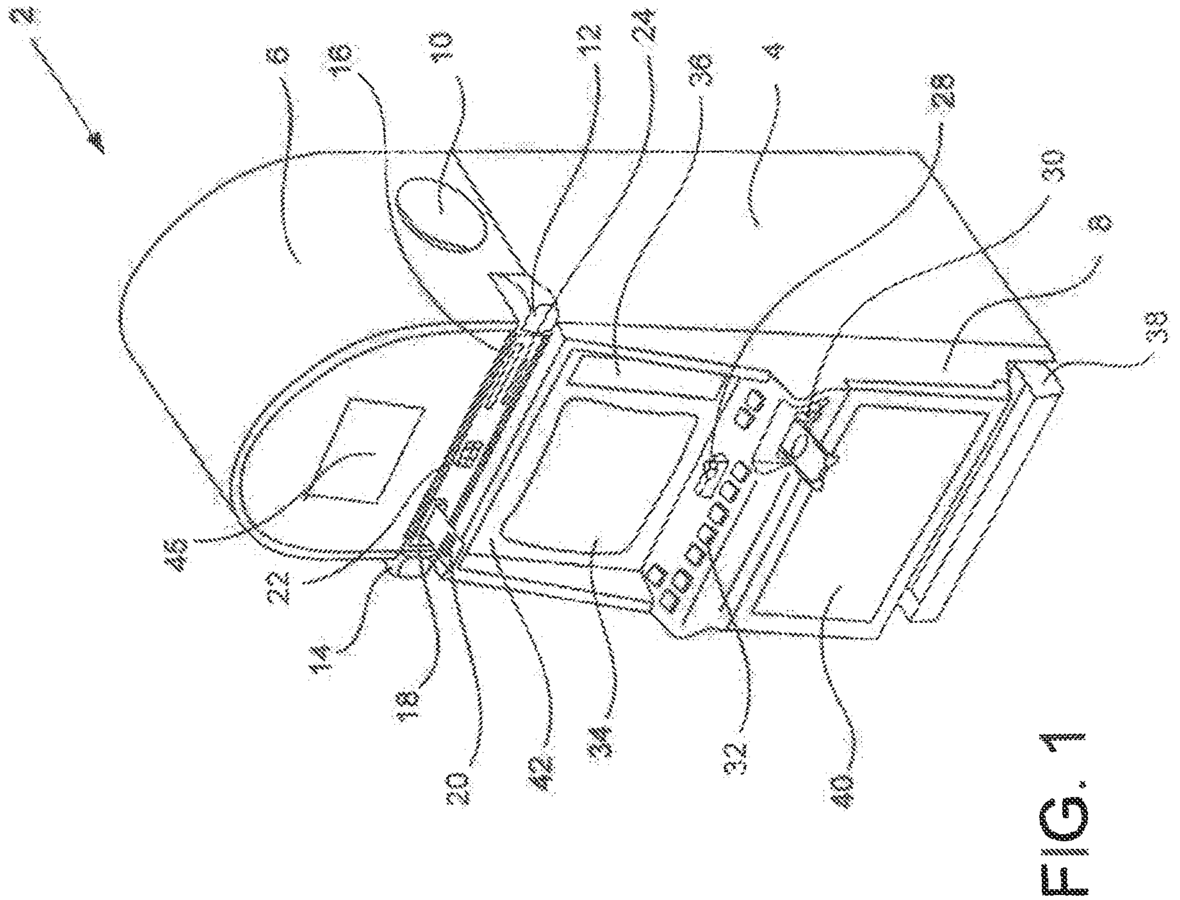
FIG. 1 shows an electronic gaming table on which the gaming method may be executed.

In the present technology there is claimed a method of executing a wagering event on an electronic gaming machine, the electronic gaming machine including a housing, a visual display, a processor with memory, player input controls, and a value-in-value-out system including at least one component selected from the group consisting of a ticket-in-ticket-out component having a reader-scanner for reading tickets and a printer for printing tickets, a currency validator with a camera and motor for retracting currency to the camera, and a near-field communication component comprising a transmitter and receiver, the method including:

a player placing value at risk as a game wager from a credit source in the memory funded through the value-in-value-out system;

the processor distributing random symbols into each frame of an at least 3-column by 3-row frame array displayed on the visual display;

at least some distributed symbols comprising partial symbols extending towards an edge of a first frame, wherein the edge of the first frame is adjacent an edge of an adjacent second frame in the at least 3-rows in the array;

the processor identifying completed symbols formed by the first frame partial symbol and a second partial symbol in the adjacent second frame;

the processor scoring the identified completed symbols as at least one of an immediate award to be paid, a multiplier for another award resulting from winning symbol outcomes in all of the frames an at least 3-column by 3-row frame array displayed on the visual display, or a trigger for an additional round of play or jackpot event; and wherein the processor with memory resolves the value at risk against a paytable for a) the identified completed symbols as at least one of an immediate award to be paid, b) the multiplier for another award resulting from winning symbol outcomes in all of the frames in the at least 3-column by 3-row frame array displayed on the visual display, or c) an additional gaming event initiated by the processor with memory for the additional round of play or the jackpot event.

In this method, adjacent and mutually completing partial symbols are combined to form a complete indicator of an absolute amounts of awards. Also, only adjacent symbols with partial images that form a specific award are rewarded, such as wherein partial symbols are combined to form a complete multiplier of an award.

One aspect of the present technology is the placement of imagery on the edges of frames that primarily face inwardly on the most exterior (farthest left and farthest right) frames, and my be facing inwardly and outwardly from the more centered frames (e.g., the middle single column of frames in a 3×3 array, and columns 2, 3 and 4 in a 5×5 array of frames). It is possible to have the most exterior left and right columns have incomplete patterns that extend outwardly, but unless the frames may be read as engaging those outermost frames, but that becomes visually difficult, and if not enabled, players will quickly understand that any such outward facing exterior symbols are likely valueless.

The frames that engage to form a winning amount must in some way complete each other in alphanumeric symbology, and likely in size and color. For example, if a leftward (inner directed) frame has half of the number "5" displayed on it, an adjacent rightward frame (facing the leftward frame) must have the corresponding other half of the number "5" to complete a winning outcome. A frame that had only two "00"s as the image would not form a "500" payout nor a fraction thereof (because of the half of a '5").

Matching symbols may also require that the numbering be of the same size, so that if there were a 10-point font of the number "5" and 24-point font of the numbers "00." That would not be a match. Also, matching colors may be required, so that even where the fonts are the same, a matching red "5" and a matching blue "00" might not be a payout. Or, non-matching, but melding symbols could receive an automatic small payment (e.g., 1, 2, 3 or 5 credits) and if the melded symbols were of the same color, the full amount of the melded value would be awarded. The same may be true with different font sizes and combinations of different font sizes and colors, where small awards are made for any two melding partial frames, but significant or the largest awards will be made only with matching content, matching sizes and matching colors.

The match is preferably direct value numbers (e.g., 1, 2, 5, 10, 15, 25, 100, 1000 etc.) as that is the simplest to visualize and for players to determine outcomes. However, multipliers (for other completed melds in the array or for other more typically awarded symbols (e.g., three cherries) can be provided. For example, if the melded symbols provide "5×," and there is a single cherry in a payout position for 1 unit, there would be an award of 5×1, or five units. In a similar array, if there had been two consecutive cherries with a payout of 3 units, the award would be 5×3 or 15 units.

Figure 2:
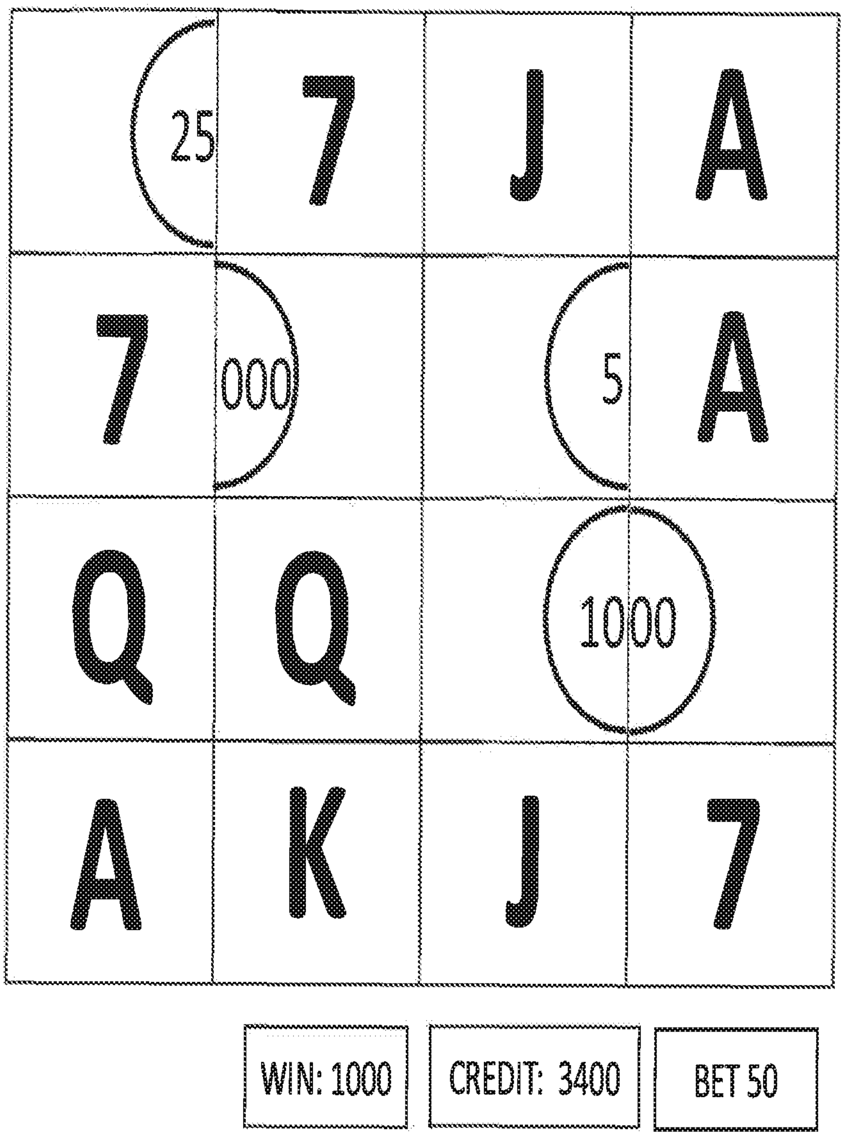
FIG. 2 shows a screen shot of a game of play of the present technology on an electronic gaming machine.

FIG. 2 shows an example where both traditional slot symbols and the secondary partial symbols. The secondary symbols must align in adjacent reels to complete the shape.

On row 3, the secondary symbols on reel 3 and 4 connect to complete the circle. The value of 10 in reel 3 combines with the value of 00 in reel. 4 to produce a 1000 credit win.

Note that on row 2, there are two adjacent secondary symbols in reels 2 and 3. However, they are not aligned in a way to complete the shape, so no credit amount is awarded).

Figure 3:
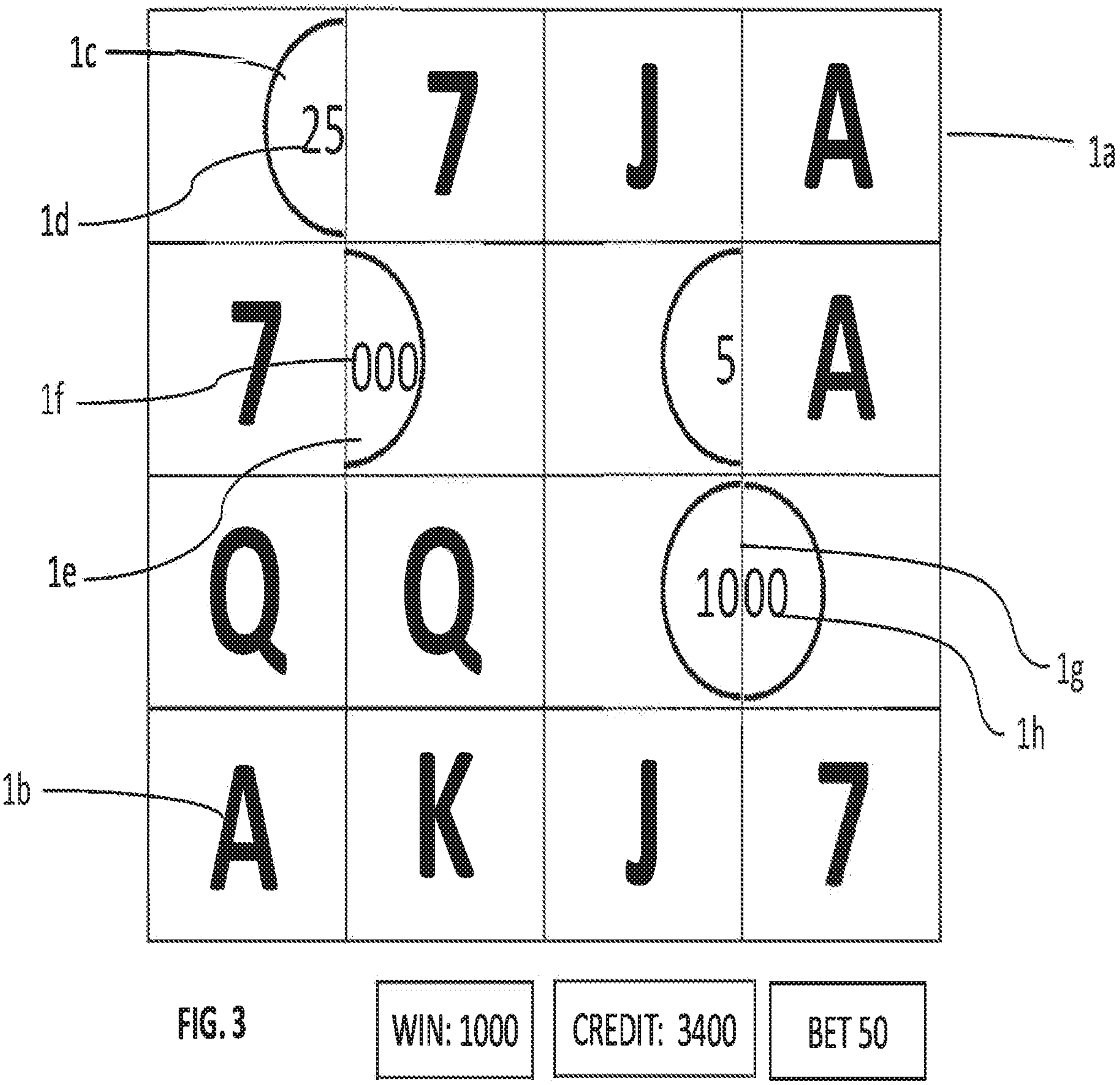
FIG. 3 shows a second screen shot of a game of play of the present technology on an electronic gaming machine.

A legend for FIG. 3 includes:

1*a* The slot game

1*b* Traditional slot symbol

1*c* $1^{st}$ half of Partial symbol

1*d* $1^{st}$ half of a credit award

1*e* $2^{nd}$ half of Partial symbol

1*f* $2^{nd}$ half of a credit award.

1*g* $1^{st}$ and $2^{nd}$ half partial symbols aligned to form complete symbol

1*h* $1^{st}$ and $2^{nd}$ half credit awards combined to produce winning amount.

A preferable card handling device for administering a video reel-type-style game is a hand-forming shuffler with integrated card recognition technology, from which playing cards are supplied, with a least a rank/count (and preferable also suit) of individual packs of cards are known before the cards are removed and delivered to player positions and/or the banker position. The card delivery system 102 is in communication with the controller 128 by wired or wireless communication methods, Communication between the various system components is not limited to electronic or electrical signals, but may include optical signals, audio signals, magnetic transmission or the like.

The individual player position processors (not shown) are preferable graphics processors and not full content CPUs as a cost saving, space saving, and efficiency benefit. With the reduced capacity in the processor as compared to a CPU, there is actually reduced likelihood of tampering and fraudulent input.

Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine, Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That separate mechanical gaming system may be in a relatively vertical viewing position as shown, or in a more horizontal (table like) display unit. Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video black jack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4, The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying player tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine, During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display-mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines are implemented with special features and/or additional circuitry that differentiates them from general-purpose computers (e.g., desktop PCs and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application, Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result, Though most modern general-purpose computers include voltage monitoring circuitry, these types of circuits only report voltage status to the operating software. Out of tolerance voltages can cause software malfunction, creating a potential uncontrolled condition in the gaming computer. Gaming machines typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion, where multiple peripheral devices are connected to a single serial channel.

The serial interfaces may be used to transmit information using communication protocols that are unique to the gaming industry. For example, the Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices, Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device, Once the trusted memory device is verified as authentic, and based on the approval of the verification algorithms contained in the trusted device, the gaming machine is allowed to verify the authenticity of additional code and data that may be located in the gaming computer assembly, such as code and data stored on hard disk drives. A few details related to trusted memory devices that may be used in the present invention are described in U.S. Pat. No. 6,685,567 titled "Process Verification," which is incorporated herein in its entirety and for all purposes.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaining machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights within the separate mechanical (or electronic) separately, individually wagerable gaming system 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

Figure 1A:
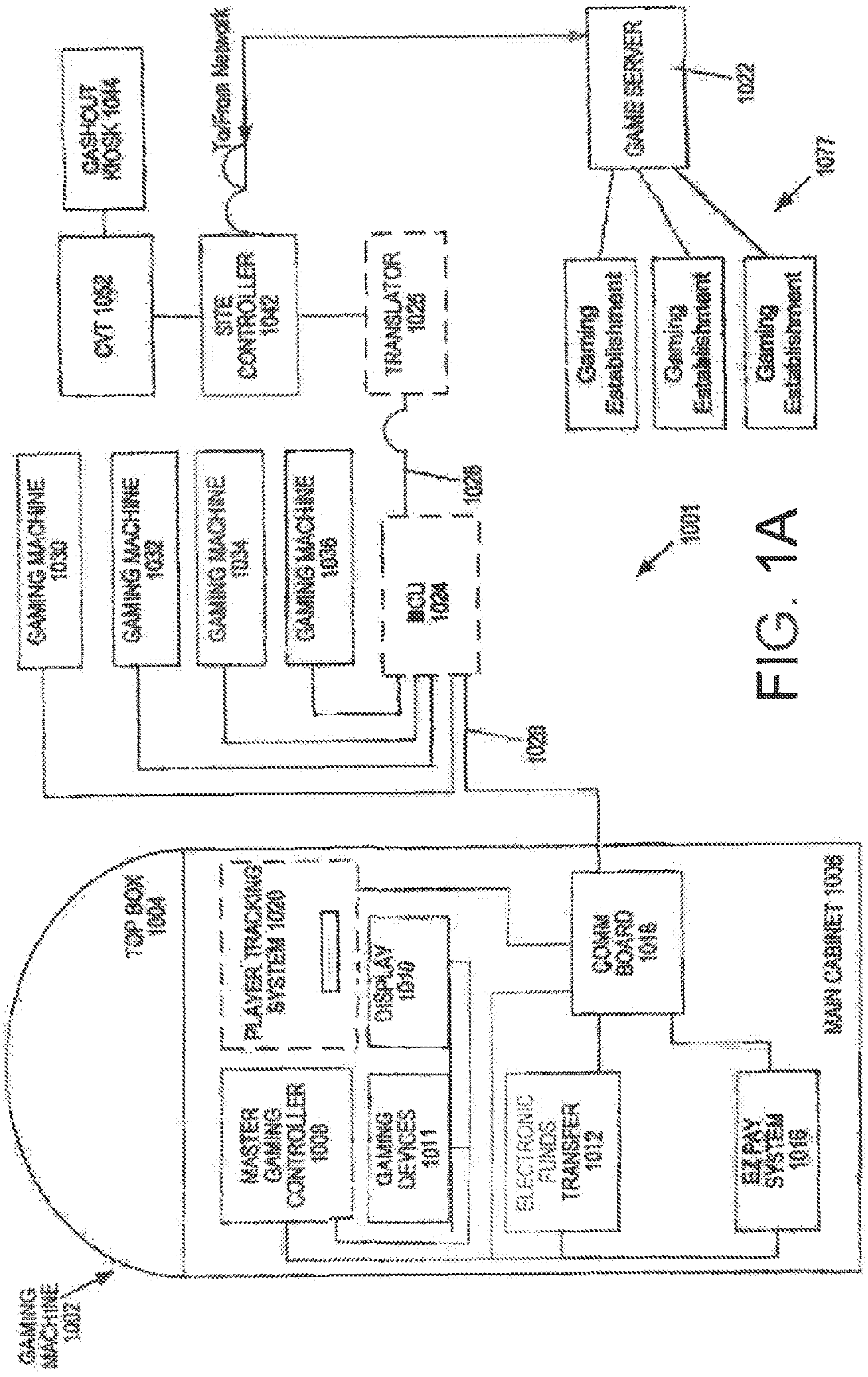
FIG. 1A shows a schematic for an electronic system for enabling play of the gaming method described herein.

Another gaming network that may be used to implement some aspects of the invention is depicted in FIG. 1A. Gaming establishment 1001 could be any sort of gaming establishment, such as a casino, a card room, an airport, a store, etc. In this example, gaming network 1077 includes more than one gaming establishment, all of which are networked to game server 1022. Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTS), cashless ticketing, such as EZPay™, marketing management, and data tracking, such as player tracking. Therefore, master gaming controller 1008 may also communicate with EFT system 1012, EZPay™ system, and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player's interest in additional game play during a visit to a gaming establishment and may entice a player to visit a gaming establishment to partake in various gaming activities. Player tracking programs provide rewards to players that typically correspond to the player's level of patronage (e.g., to the player's playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

The gaming credit accessing system may be electronic, with multiple nodes accessed during the transaction, as shown in US Patent Document No. 20150243133 (Nicholas) wherein funds are provided to a player at a machine through a personal electronic device (PED) provided with an app sending a communication to a funding establishment that supports a financial card. The communication contains data identifying a) a specific financial card and a specific account established at a gaming facility where the gaming apparatus is located and b) amounts of funds to be applied against the financial card and transferred to the specific financial account. The specific financial account electronically transfers funds for available use by the player upon command by the player to the specific financial account. The player profile database is mainly player inputted preferences and gaming trends data stored into each player's profile. These can be accessed/verified with recognition of the player's phone, biometric scan, access card, password, or other terminal kiosk, touch screen, or mobile application.

Any other format of personal electronic device that can communicate through the wagering apparatus (EGM or table) an internal casino or gaming house gaming apparatus and financial services provider (in or through the gaming establishment). This provider would be the cashier, a separate club membership with accounts, an account with rights to pass charges onto a personal player account with a credit or debit card, or direct ETF transfer from a bank account.

Figure 1B:
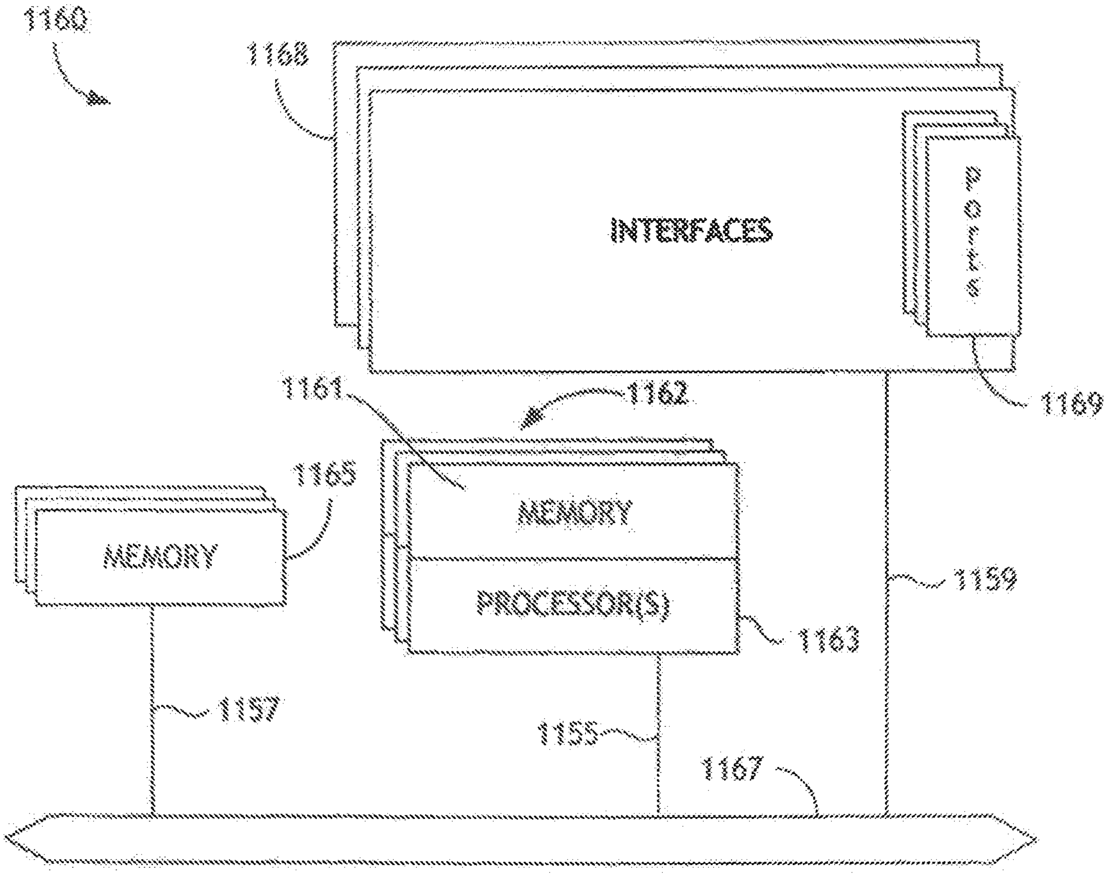
FIG. 1B shows another schematic for an electronic system for enabling play of the gaming method described herein.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1161. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention also relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1B illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

The method may have the processor store memory of a single image that can be completed by all of the at least three column by three row symbols and the paytable includes a distinct payout for completion of the single image. The may include multiple separate and distinct ones of the single image stored in memory, and either randomly selected by the processor or elected by a player.

The electronic gaming machine may further include a first distinct player input control to scrolls through the multiple separate and distinct ones of the single image stored in memory, and the player scrolls through those multiple separate and distinct ones of the single image stored in memory, stops the display screen at a desired single image and then initiates play of the processor distributing random symbols into each frame of an at east 3-column by 3-row frame array displayed on the visual display.

The method may be practiced wherein there is only a single paytable stored in memory for resolution of the value at risk, and that paytable provides awards independent of any theme on the separate and distinct ones of the single image stored in memory. That is, for example, there may be an image of The Last Supper, Disney characters, superhero characters, science fiction characters or the like in distinctively themed overall single images. The frames may complete one or more of the individual characters within a single-themed overall image, but awards are the same for individual characters in specific locations among the frames in all of the single image themes.

There may be a second distinct player input control that is in communication with a central server at a gaming facility, and before initiation of a gaming event on the electronic gaming machine, the second distinct player input control is set by the player to select a specific compensation package managed.

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

What is claimed is:

1. A system, comprising:

one or more processors coupled to memory, the one or more processors configured to:

provide a first set of random symbols for presentation in a graphical user interface displayed on a visual display, each random symbol of the first set of random symbols presented in one of at least three columns of the graphical user interface, at least one of the first set of random symbols comprising a first partial symbol presented within a first column of the at least three columns;

identify a completed symbol formed by the first partial symbol in the first column and a second partial symbol in a second column adjacent to the first column;

determine a first value shown by a first completed symbol formed by the first partial symbol in the first column and the second partial symbol in the second column, wherein the first partial symbol is configured to match with a third partial symbol to form a second completed symbol showing a second value; and cause a credit balance to be adjusted based on the first value shown by the first completed symbol.

2. The system of claim 1, wherein the one or more processors are further configured to:

provide a second set of random symbols for presentation in the graphical user interface, the second set of random symbols comprising the first partial symbol and the third partial symbol, the first partial symbol displayed adjacent to the third partial symbol;

determine the second value shown by the second completed symbol formed by the first partial symbol and the third partial symbol adjacent to the first partial symbol; and cause the credit balance to be adjusted by the second value shown by the second completed symbol.

3. The system of claim 1, wherein the one or more processors are further configured to update the graphical user interface to indicate the first value shown by the first completed symbol.

4. The system of claim 1, wherein the first set of random symbols comprises a third completed symbol showing a third value, and wherein the one or more processors are further configured to cause the credit balance to be adjusted by the first value and the third value.

5. The system of claim 1, wherein the one or more processors are further configured to provide the first partial symbol and the second partial symbol for presentation in a first row of the graphical user interface.

6. The system of claim 1, wherein the first value comprises a multiplier value.

7. The system of claim 6, wherein the one or more processors are further configured to adjust the credit balance by multiplying an award amount by the multiplier value.

8. The system of claim 1, wherein the one or more processors are further configured to store, in the memory, an image segmented into a plurality of partial symbols, the image associated with a distinct award for completion of the image via a corresponding arrangement of the plurality of partial symbols presented in the graphical user interface.

9. The system of claim 1, wherein the one or more processors are further configured to:

receive a selection of a wager amount via user input; and provide the first set of random symbols for presentation in the graphical user interface responsive to the selection.

10. The system of claim 1, wherein the one or more processors are further configured to:

provide at least one third symbol of the first set of random symbols for presentation in the graphical user interface; and cause the credit balance to be adjusted further based on the at least one third symbol.

11. A method, comprising:

providing, by one or more processors coupled to memory, a first set of random symbols for presentation in a graphical user interface displayed on a visual display, each random symbol of the first set of random symbols presented in one of at least three columns of the graphical user interface, at least one of the first set of random symbols comprising a first partial symbol presented within a first column of the at least three columns;

identifying, by the one or more processors, a completed symbol formed by the first partial symbol in the first column and a second partial symbol in a second column adjacent to the first column;

determining, by the one or more processors, a first value shown by a first completed symbol formed by the first partial symbol in the first column and the second partial symbol in the second column, wherein the first partial symbol is configured to match with a third partial symbol to form a second completed symbol showing a second value; and causing, by the one or more processors, a credit balance to be adjusted based on the first value shown by the first completed symbol.

12. The method of claim 11, further comprising:

providing, by the one or more processors, a second set of random symbols for presentation in the graphical user interface, the second set of random symbols comprising the first partial symbol and the third partial symbol, the first partial symbol displayed adjacent to the third partial symbol;

determining, by the one or more processors, the second value shown by the second completed symbol formed by the first partial symbol and the third partial symbol adjacent to the first partial symbol; and causing, by the one or more processors, the credit balance to be adjusted by the second value shown by the second completed symbol.

13. The method of claim 11, further comprising updating, by the one or more processors, the graphical user interface to indicate the first value shown by the first completed symbol.

14. The method of claim 11, wherein the first set of random symbols comprises a third completed symbol showing a third value, and further comprising causing, by the one or more processors, the credit balance to be adjusted by the first value and the third value.

15. The method of claim 11, further comprising providing, by the one or more processors, the first partial symbol and the second partial symbol for presentation in a first row of the graphical user interface.

16. The method of claim 11, wherein the first value comprises a multiplier value.

17. The method of claim 16, further comprising adjusting, by the one or more processors, the credit balance by multiplying an award amount by the multiplier value.

18. The method of claim 11, further comprising storing, by the one or more processors, in the memory, an image segmented into a plurality of partial symbols, the image associated with a distinct award for completion of the image via a corresponding arrangement of the plurality of partial symbols presented in the graphical user interface.

19. The method of claim 11, further comprising:

receiving, by the one or more processors, a selection of a wager amount via user input; and providing, by the one or more processors, the first set of random symbols for presentation in the graphical user interface responsive to the selection.

20. The method of claim 11, further comprising:

providing, by the one or more processors, at least one third symbol of the first set of random symbols for presentation in the graphical user interface; and causing, by the one or more processors, the credit balance to be adjusted further based on the at least one third symbol.

* * * * *